(12) United States Patent
Lin

(10) Patent No.: US 7,885,458 B1
(45) Date of Patent: Feb. 8, 2011

(54) ILLUMINANT ESTIMATION USING GAMUT MAPPING AND SCENE CLASSIFICATION

(75) Inventor: Shang-Hung Lin, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 992 days.

(21) Appl. No.: 11/262,107

(22) Filed: Oct. 27, 2005

(51) Int. Cl.
G06K 9/00 (2006.01)
G06K 9/40 (2006.01)

(52) U.S. Cl. .................. 382/167; 382/162; 382/274
(58) Field of Classification Search .................. 382/162, 382/167, 274
See application file for complete search history.

(56) References Cited

U.S. PATENT DOCUMENTS

| | | | |
|---|---|---|---|
| 3,904,818 A | 9/1975 | Kovac | |
| 4,253,120 A | 2/1981 | Levine | |
| 4,642,684 A * | 2/1987 | Alkofer | 358/522 |
| 4,739,495 A | 4/1988 | Levine | |
| 4,920,428 A | 4/1990 | Lin et al. | |
| 5,652,621 A | 7/1997 | Adams, Jr. et al. | |
| 5,667,944 A * | 9/1997 | Reem et al. | 430/359 |
| 5,850,470 A * | 12/1998 | Kung et al. | 382/157 |
| 6,038,339 A * | 3/2000 | Hubel et al. | 382/162 |
| 6,377,702 B1 * | 4/2002 | Cooper | 382/167 |
| 6,683,643 B1 | 1/2004 | Takayama et al. | |
| 6,724,932 B1 | 4/2004 | Ito | |
| 6,785,814 B1 | 8/2004 | Usami et al. | |
| 6,873,727 B2 * | 3/2005 | Lopez et al. | 382/162 |
| 6,900,836 B2 | 5/2005 | Hamilton, Jr. | |
| 7,009,639 B1 | 3/2006 | Une et al. | |
| 7,092,018 B1 | 8/2006 | Watanabe | |
| 7,133,072 B2 | 11/2006 | Harada | |
| 7,305,148 B2 | 12/2007 | Spampinato et al. | |
| 7,486,844 B2 | 2/2009 | Chang et al. | |
| 7,502,505 B2 | 3/2009 | Malvar et al. | |
| 7,671,910 B2 | 3/2010 | Lee | |
| 2002/0015111 A1 | 2/2002 | Harada | |
| 2002/0044778 A1 | 4/2002 | Suzuki | |
| 2002/0105579 A1 | 8/2002 | Levine et al. | |
| 2002/0167602 A1 | 11/2002 | Nguyen | |

(Continued)

FOREIGN PATENT DOCUMENTS

CN 1275870 12/2000

(Continued)

OTHER PUBLICATIONS

"Method of Color Interpolation in a Single Sensor Color Camera Using Green Channel Separation" Weerasighe, et al. Visual Information Processing Lab, Motorola Australian Research Center pp. IV-3233-IV3236.

(Continued)

*Primary Examiner*—Samir A. Ahmed
*Assistant Examiner*—Li Liu

(57) ABSTRACT

Methods and systems for processing image data are described. A scene classifier determines the probabilities that various scene classes are associated with the image data. A gamut mapper determines the probabilities that various combinations of illuminant color and scene class are associated with the image data. The probabilities from the scene classifier are used to weight the probabilities from the gamut mapper. The weighted results can be used to select an illuminant color. The image data can be adjusted to compensate for the selected illuminant color.

21 Claims, 5 Drawing Sheets

U.S. PATENT DOCUMENTS

| | | |
|---|---|---|
| 2003/0007076 A1* | 1/2003 | Okisu et al. .............. 348/222.1 |
| 2003/0194125 A1* | 10/2003 | Hubel et al. ................ 382/162 |
| 2003/0222995 A1 | 12/2003 | Kaplinsky et al. |
| 2004/0001234 A1 | 1/2004 | Curry et al. |
| 2004/0032516 A1 | 2/2004 | Kakarala |
| 2004/0120572 A1* | 6/2004 | Luo et al. ................... 382/159 |
| 2005/0069201 A1* | 3/2005 | Speigle et al. ............. 382/167 |
| 2005/0238225 A1 | 10/2005 | Jo et al. |
| 2005/0248671 A1 | 11/2005 | Schweng |
| 2005/0264658 A1* | 12/2005 | Ray et al. ................... 348/239 |
| 2006/0176375 A1 | 8/2006 | Hwang et al. |
| 2007/0091188 A1 | 4/2007 | Chen et al. |
| 2007/0247532 A1 | 10/2007 | Sasaki |
| 2009/0010539 A1 | 1/2009 | Guarnera et al. |
| 2009/0116750 A1 | 5/2009 | Lee et al. |

FOREIGN PATENT DOCUMENTS

| | | |
|---|---|---|
| WO | 2004063989 | 7/2004 |

OTHER PUBLICATIONS

Kuno et al, "New Interpolation Method Using Discriminated Color Correlation for Digital Still Cameras" IEEE Transac. on Consumer Electronics, vol. 45, No. 1, Feb. 1999, pp. 259-267.

* cited by examiner

ILLUMINANT ESTIMATION USING GAMUT MAPPING AND SCENE CLASSIFICATION

FIELD OF THE INVENTION

Embodiments of the present invention generally relate to the processing of image data.

BACKGROUND ART

The human visual system perceives the same range of colors under a wide variety of scene illuminations. A white piece of paper remains resolutely white independent of the color of the illuminant (the color of the light under which the piece of paper is viewed). In contrast, color imaging systems (e.g., digital cameras) are less color constant in that they will often incorrectly infer the color of the illuminant. Unless the influence of the color of the illuminant is compensated, the digital camera cannot acceptably reproduce actual scene colors. The process of "correcting" the image data to compensate the effect of the illuminant color is commonly referred to as white balancing.

In white balancing, the color of the scene illumination either is measured or is estimated from the image data, and then the image data is adjusted to compensate for the effect of the illuminant. Because it is not practical to equip each camera with a dedicated illumination sensor and then expect users to calibrate to a white reference every time a picture is taken, conventional cameras typically estimate the illuminant color from the image data.

According to one conventional white balancing method, all of the pixel color values in an image are averaged, and the image data is then adjusted so that the average of the pixel color values is gray. According to another conventional white balancing method, the brightest spot (a specularity) in an image is presumed to be the light source, the color of that specularity is presumed to be the color of the illuminant, and the image data is adjusted to compensate for the color of the illuminant. These types of methods are simple to implement but unfortunately they fail in many scenarios because they are based on assumptions that do not always hold true. For example, the average color of a scene may not actually be gray, and a specularity may not appear in an image (and when present may be difficult to find).

Other attempts to address the illuminant estimation problem use a probabilistic framework. Given an input image $C_{im}$, the objective of a probabilistic approach is to recover $Pr(E|C_{im})$—the probability that E was the scene illuminant given $C_{im}$. The illuminant hypothesis $E_i$ that produces the largest $Pr(E|C_{im})$ is the estimated scene illuminant. According to Bayes' Rule:

$$Pr(E \mid C_{im}) = \frac{Pr(C_{im} \mid E)Pr(E)}{Pr(C_{im})}; \quad (1)$$

where $Pr(E)$ is the probability that the scene illuminant is E, and $Pr(C_{im}|E)$ is the probability of observing the image $C_{im}$ under illuminant E.

$Pr(C_{im})$ is a constant regardless of the illuminant, so it can be omitted from equation (1) without changing the outcome of the maximum probability estimation:

$$Pr(E|C_{im})=Pr(C_{im}|E)Pr(E); \quad (2)$$

where $Pr(E)$ is the probability of illuminant E. In most cases, $Pr(E)$ is assigned an equal value for all illuminant colors. The likelihood function $Pr(C_{im}|E)$ is typically estimated by assuming that the chromaticity values of the pixels in an image are independent of each other, so that $Pr(C_{im}|E)$ can be replaced in equation (2) by the product of the conditional probabilities of the pixel given illuminant E:

$$Pr(E \mid C_{im}) = \left[\prod_{\forall c \in C_{im}} Pr(c \mid E)\right] Pr(E); \quad (3)$$

where c is the color (chromaticity) of a pixel in image $C_{im}$, and $Pr(c|E)$ indicates how "probable" it is that the camera would capture a color c under the illuminant color E (that is, given an illuminant color E, what is the probability that color c would be observed in the image).

In order to generate $Pr(c|E)$, a correlation matrix is created to correlate possible image colors with potential colors of scene illuminants. The correlation matrix characterizes, for each illuminant color considered, the range of possible image colors that can be observed under that illuminant color. In other words, a "camera gamut" for each potential illuminant color is constructed.

To implement a correlation matrix in a camera, training image data is used to create a two-dimensional (2D) or even three-dimensional (3D) color histogram for each illuminant color considered, and the histograms are installed in the camera's memory as lookup tables. If pixel color is represented using eight (8) bits per pixel, and the probabilistic score $Pr(c|E)$ is represented in an 8-bit format, a 2D lookup table requires 64,000 bytes of memory per illuminant color, and a 3D lookup table requires 16,000,000 bytes of memory per illuminant color. Because multiple illuminant colors are typically considered, an extensive amount of memory can be consumed by a conventional correlation matrix.

SUMMARY OF THE INVENTION

Thus, one problem with conventional white balancing approaches is that they can consume an extensive amount of a camera's memory. Another problem with conventional approaches is that they are heavily biased by the training image database that is used to generate the correlation matrix. If the training image database is not carefully selected, estimation of the illuminant color can be adversely affected. For example, it is important to match the training image database with the type of image data expected to be encountered when the camera is put to use. Studies on this subject have demonstrated that conventional training image databases are problematic.

Consequently, methods and/or systems that can be used for white balancing, but that consume less memory, would be advantageous. Methods and/or systems that can accomplish this with an improved training image database would also be advantageous. Embodiments in accordance with the present invention provide these and other advantages.

In overview, embodiments in accordance with the present invention utilize an integrated framework to improve the performance of probabilistic or correlation-based illuminant estimation methods. In one embodiment, incoming image data goes through a scene classifier and a gamut mapper. The scene classifier determines the probabilities that various scene classes (e.g., indoor, landscape, sky, portrait, etc) are associated with the image data. The gamut mapper determines the probabilities that various combinations of illuminant color and scene class are associated with the image data.

The probabilities from the scene classifier are used to weight the probabilities from the gamut mapper. The weighted results can be used to select an illuminant color. The image data can be adjusted to compensate for the selected illuminant color.

According to embodiments of the present invention, the correlation matrix used by the gamut mapper is scene class-dependent. As a result, the process of preparing the training image database can be better focused. Also, because construction of the correlation matrix focuses on the most probable colors that can occur within the scene classes considered, the effective camera gamut is contracted and thus the memory requirement for the correlation matrix can be reduced. These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Figure 1:
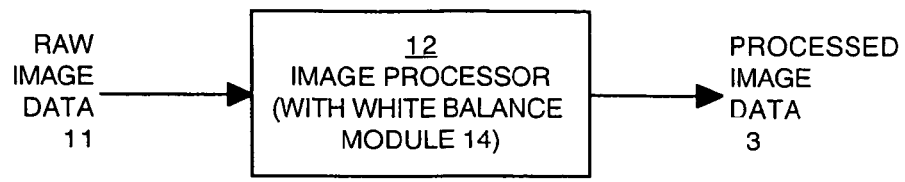
FIG. 1 is a block diagram showing an image processor according to one embodiment of the present invention.

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "weighting," "selecting," "repeating," "summing," "using," "identifying," "adjusting," "accessing" or the like, refer to actions and processes (e.g., flowchart 60 of FIG. 6) of a computer system or similar electronic computing device or processor. The computer system or similar electronic computing device manipulates and transforms data represented as physical (electronic) quantities within the computer system memories, registers or other such information storage, transmission or display devices. The present invention is well suited to use with other computer systems.

FIG. 1 is a block diagram showing an image processor 12 according to one embodiment of the present invention. Raw image data 11 is captured (that is, for example, a picture is taken with a digital camera), then processed by image processor 12 to produce processed image data 13. In the present embodiment, image processor 12 incorporates a white balance module 14 for illuminant estimation and compensation. Image processor 12 may perform other functions. In one embodiment, image processor 12 is implemented as part of a digital camera (see FIG. 5, for example).

The image data 11 and 13 (FIG. 1) can be referred to as a frame of image data. The image data 11 and 13 may represent a "still" picture. The image data 11 and 13 may also represent a video or movie, because a video is essentially a sequence of still images.

Figure 2:
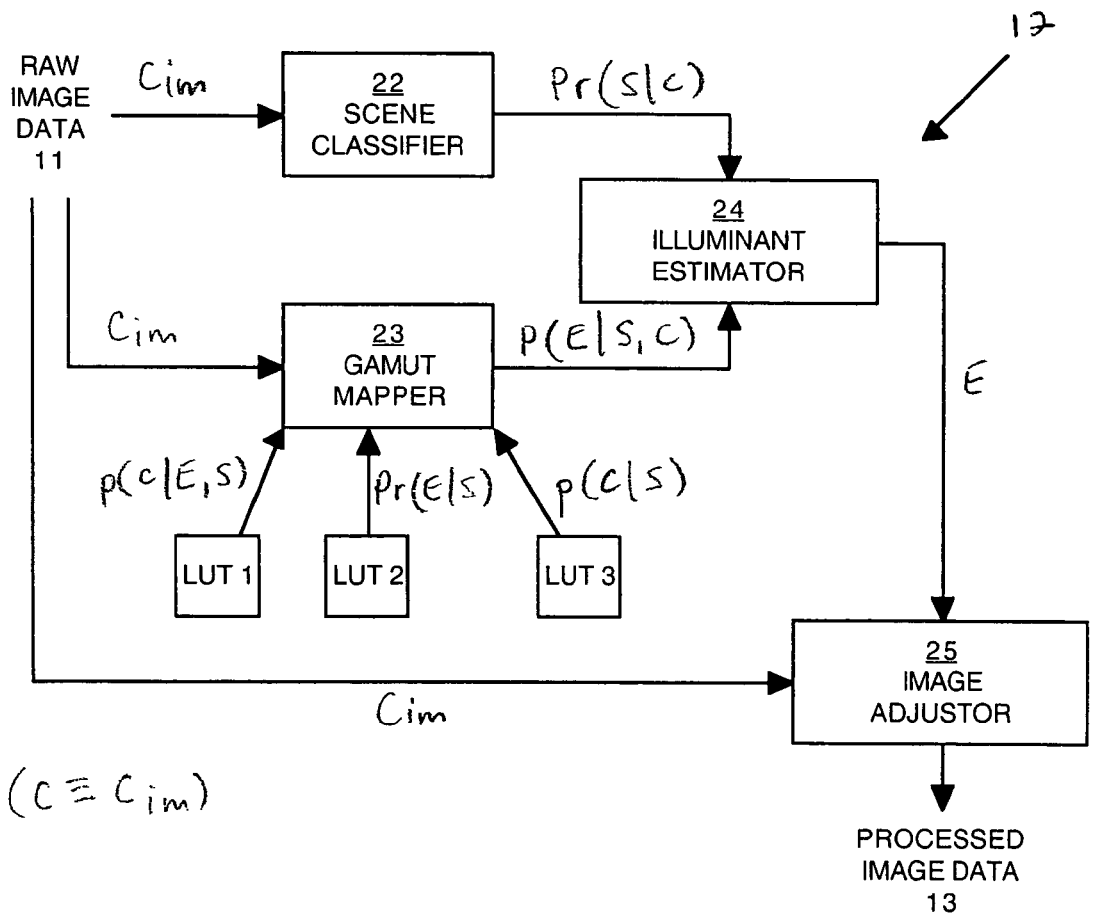
FIG. 2 is a data flow diagram showing information flow through an image processor according to one embodiment of the present invention.

FIG. 2 is a data flow diagram showing information flow through image processor 12 (FIG. 1) according to one embodiment of the present invention. In the present embodiment, raw image data 11 (C or $C_{im}$ may be used interchangeably herein) is forwarded to scene classifier 22, gamut mapper 23 and image adjustor 25.

Scene classifier 22 determines the probability that $S_N$ is the scene class given the raw image data 11. This probability is expressed herein as $Pr(S_N|C)$ or $Pr(S_N|C_{im})$. For example, there may be N scene classes, and scene classifier 22 determines, given the raw image data 11, a first probability that $S_1$ is the scene class, a second probability that $S_2$ is the scene class, and so on.

Scene classification is a technique used for image database indexing and content retrieval. Scene classification is known in the art. The classification can be done by image segmentation or by qualitative scene structure encoding. Several predetermined scene classes, such as but not limited to portrait, landscape, beach, sky, ski, sunset and indoor, are assigned and trained in the scene classifier a priori. The output of the scene classifier is the confidence level (expressed herein as a probability) that the given image resembles a certain class of scene.

If scene classifier 22 categorizes the images into N different scene classes, then $Pr(E|C_{im})$—the probability that E was the scene illuminant given $C_{im}$—can be expressed as:

$$Pr(E|C_{im}) = \sum_N Pr(S|C_{im})Pr(E|C_{im},S); \qquad (4)$$

where $Pr(S|C_{im})$ is the probabilistic output score (e.g., the confidence level or probability) of the scene classifier 22 for the scene class S, and $Pr(E|C_{im},S)$ is the probability that E was the scene illuminant given $C_{im}$ for the scene class S. $Pr(E|C_{im},S)$ can be further expanded by Bayes' Rule as follows:

$$Pr(E|C_{im}) = \sum_N Pr(S|C_{im}) \frac{p(C_{im}|E,S)Pr(E|S)}{p(C_{im}|S)}; \qquad (5)$$

where $p(C_{im}|E,S)$ is the probability of observing $C_{im}$ given E and S (that is, what is the probability of obtaining the image data $C_{im}$ if E is the illuminant color and S is the scene class), $Pr(E|S)$ is the probability that the illuminant is E given the scene class S, and $p(C_{im}|S)$ is the probability of observing $C_{im}$ given S (that is, what is the probability of obtaining the image data $C_{im}$ if S is the scene class).

In one embodiment, $p(C_{im}|E,S)$, $Pr(E|S)$ and $p(C_{im}|S)$ are implemented as lookup tables (LUTs) 1, 2 and 3, respectively. The LUTs are scene class-dependent; thus, there is a lookup table for each scene class S. In one embodiment, gamut mapper 23 determines $P(E|C,S)$ for each of the M illuminant colors E being considered, where $P(E|C,S)$ is the probability that E is the illuminant color given the scene class S and the image data C.

The probability $Pr(S|C_{im})$ from scene classifier 22 can be viewed as a weighting factor that is applied by illuminant estimator 24 to the scene class-dependent gamut mapping results $P(E|C,S)$ from gamut mapper 23. The probability $Pr(S|C_{im})$ can be obtained directly from the output of the scene classifier 22, because $Pr(S|C_{im})$ represents the probability of scene class S if the incoming image is $C_{im}$. This is illustrated further by FIGS. 3 and 4, below.

With reference to FIG. 2, illuminant estimator 24 determines $Pr(E|C_{im})$—the probability that E was the scene illuminant given $C_{im}$—for each of the M illuminant colors being evaluated. In one embodiment, the illuminant color E that corresponds to the largest value of $Pr(E|C_{im})$ is selected. Using this information, image adjustor 25 adjusts the raw image data 11 to compensate for the effect of the illuminant color E, thereby generating processed image data 26. Processed image data 26 may be displayed to the user or downloaded to a personal computer or printer, for example.

The correlation matrix $p(C_{im}|E,S)$ can be implemented as a 2D or 3D histogram (with a smaller data range relative to conventional art), or by other clustering/classification schemes, such as but not limited to VQ (vector quantization), SVM (support vector machine), and neural network.

The value of $p(C_{im}|S)$ is independent of the illumination color, and is implemented as a constant value for each scene class S.

$Pr(E|S)$ is a pre-programmed value. As mentioned above, it indicates how probable it is that illuminant E can occur if the scene class is S. For example, if the image is categorized as landscape, the score for daylight illuminants would be higher than incandescent or fluorescent illuminants.

Significantly, instead of a large multipurpose correlation matrix as applied in equation (3), embodiments in accordance with the present invention decompose the correlation matrix into several scene class-dependent lookup tables. One of the advantages of creating scene class-dependent LUTs is that the preparation of the training image database is more focused and guided. For example, to build a correlation matrix for the portrait scene class, the skin tone color becomes a major color cue, as the blue tone is for the sky/sea classes and the green tone is for the landscape/vegetation classes. The major color cues will be the major contributor for building the correlation matrix of the corresponding scene class. More major color samples are collected, finer resolution at the major color zone is prepared, and a higher weighting factor is assigned. The non-major colors can either be de-emphasized or even omitted. Down-playing the non-major colors reduces the chance of a false positive error. It is also expected to save memory space, because the correlation matrix covers only the spread of the major colors instead of the whole color spectrum.

There could be more than one major color for a scene class. For example, the landscape class may use green, blue, and gray as major colors, and the sunset class can use yellow and red.

Equation (5) is implemented on a per-pixel basis. If the scene classifier 22 applies image segmentation techniques, the likelihood function $p(C_{im}|E,S)$ of equation (5) can be further decomposed to:

$$p(C_{im}|E,S) \approx \prod_K p(K|E,S); \qquad (6)$$

where K represents an image segment of similar color. Thus, instead of processing (white balancing) the image data pixel-by-pixel, the processing can be performed on a per-segment basis. Image segmentation techniques are known in the art.

If the scene classifier does not use an image segmentation technique, equation (6) may still be applicable if the definition of K is changed from an image segment to a major or non-major color. In other words, in one instance, segmentation is performed by grouping pixels of a similar color where the pixels in a segment are spatially dependent, and in another instance, segmentation is performed by grouping pixels of a similar color where the pixels in the segments are spatially independent. For example, in the former instance, if the image data represents an image of a landscape, with an expanse of blue sky in the background and a similarly colored blue object in the foreground, the pixels associated with the blue sky would be grouped in one segment and the pixels associated with the foreground object would be grouped in another segment. However, in the latter instance, the pixels associated with the blue sky and the pixels associated with the foreground object would be grouped in the same segment.

Figure 3:
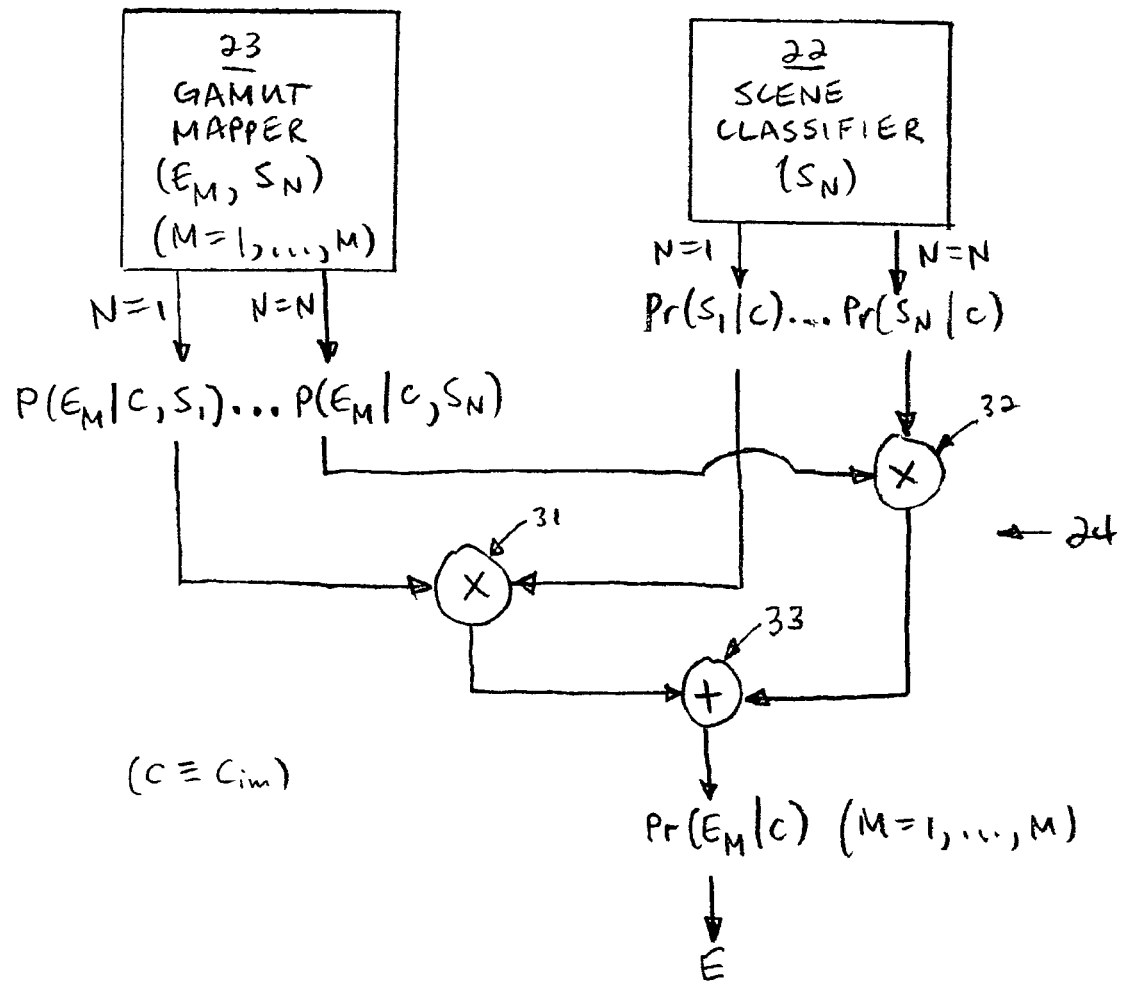
FIG. 3 is a data flow diagram showing operations performed by an image processor according to one embodiment of the present invention.

FIG. 3 is a data flow diagram showing operations performed by an image processor 12 of FIG. 1 according to one embodiment of the present invention. More specifically, in one embodiment, the operations of FIG. 3 are performed by illuminant estimator 24 of FIG. 2.

For each of the M illuminant colors being considered, and for each of the N possible scene classes (that is, for each possible combination of M and N), gamut mapper 23 determines a value of $P(E|C,S)$ that is input to illuminant estimator 24. For each of the N possible scene classes, scene classifier 22 determines a value for $Pr(S|C_{im})$ that is input to illuminant estimator 24.

With references to FIGS. 2 and 3, at multipliers 31 and 32, for M=1, 2, ..., M, illuminant estimator 24 multiplies each value of P(E|C,S) and a respective value of Pr(S|C$_{im}$). That is, for M=1, 2, ..., M, the value of P(E$_M$|C,S) for a particular scene class is multiplied by the value of Pr(S|C$_{im}$) for the same scene class. For example, for M=1, 2, ..., M, the value of P(E$_M$|C,S$_1$) is multiplied by the value of Pr(S$_1$|C$_{im}$); the value of P(E$_M$|C,S$_2$) is multiplied by the value of Pr(S$_2$|C$_{im}$); and so on, for N=1, 2, ..., N.

For each illuminant color being evaluated, illuminant estimator 24 then sums the results of the multiplication operations to determine Pr(E$_M$|C), M=1, 2, ..., M: That is, the results of the multiplication operations include a probability value for each illuminant color for each scene class. Thus, for example, there is a first set of probability values for illuminant E$_1$ for all of the scene classes S$_1$, S$_2$, ..., S$_N$; a second set of probability values for illuminant E$_2$ for all of the scene classes S$_1$, S$_2$, ..., S$_N$; and so on, for M=1, 2, ..., M. At adder 33, the probability values within each set are added. Thus, for example, the individual values within the first set (associated with illuminant E$_1$) are added to determine a probability value Pr(E$_1$|C). In one embodiment, the illuminant color E that is associated with the largest value of Pr(E$_M$|C) is selected as the illuminant color that in turn may be used by image adjustor 25 (FIG. 2) to compensate for the effects of the illuminant on the raw image data 11.

Figure 4:
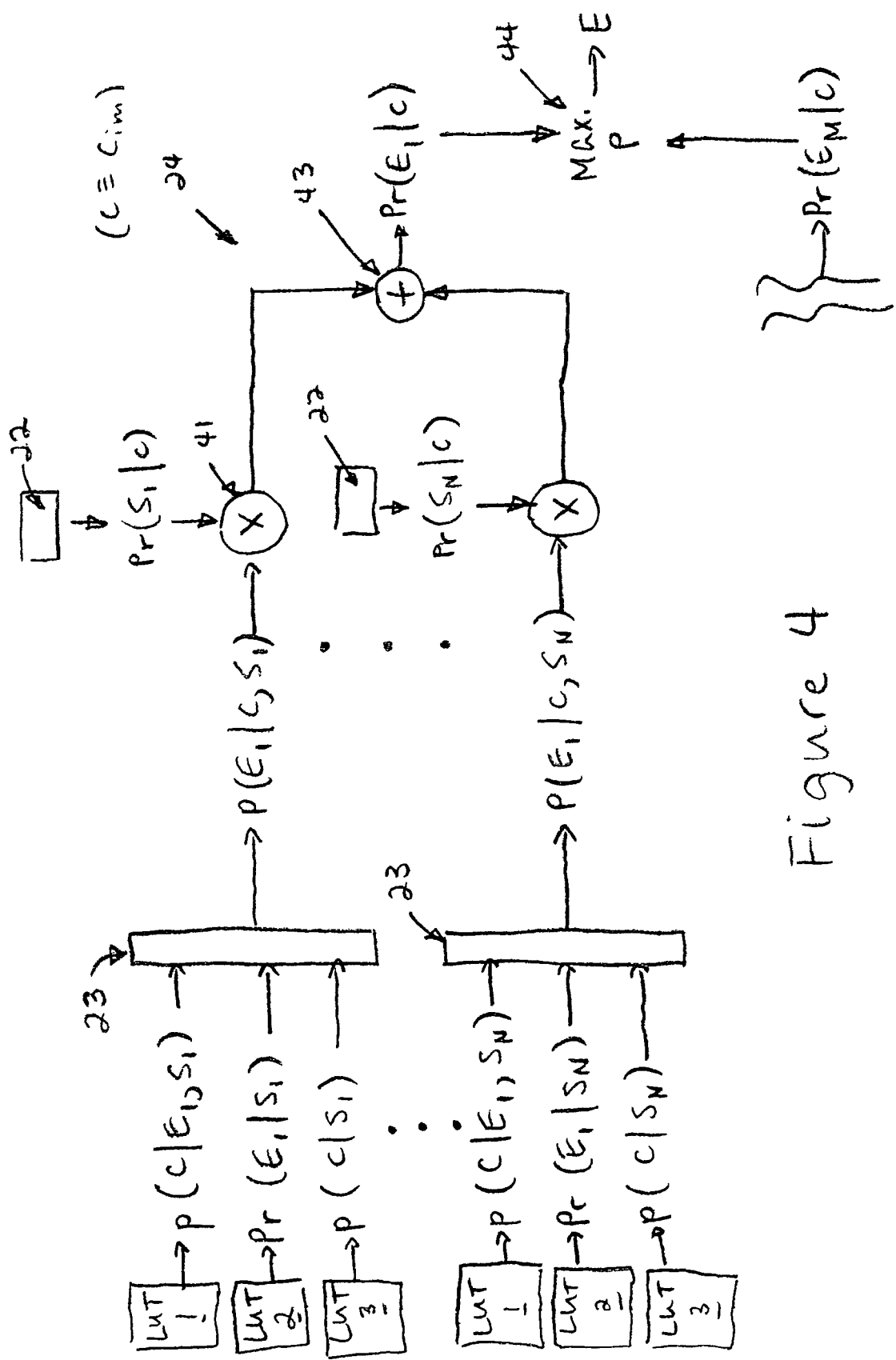
FIG. 4 is also a data flow diagram showing operations performed by an image processor according to one embodiment of the present invention.

FIG. 4 is a data flow diagram also showing operations performed by an image processor 12 (FIG. 1) according to one embodiment of the present invention. More specifically, in one embodiment, the operations of FIG. 3 are performed by illuminant estimator 24 of FIG. 2.

For each scene class N=1, 2, ..., N, gamut mapper 23 determines a probability value P(E$_1$|C,S). For example, for scene class S=1, gamut mapper 23 accesses the appropriate scene class-dependent set of LUTs 1, 2 and 3 to fetch p(C|E$_1$, S$_1$), Pr(E$_1$|S$_1$) and p(C|S$_1$) and determines P(E$_1$|C,S$_1$). At multiplier 41, for scene class S=1, P(E$_1$|C,S$_1$) is weighted by multiplying P(E$_1$|C,S$_1$) and Pr(S$_1$|C) from scene classifier 22.

The fetch and multiply operations described in the preceding paragraph are repeated for each scene class N=1, 2, ..., N for illuminant color E$_1$. At adder 43, the results of the multiply operations are added. Thus, the output of adder 43 is the probability Pr(E$_1$|C) that E$_1$ is the illuminant color given the raw image data C.

The operations described in the above discussion of FIG. 4 are also repeated for each illuminant color E$_M$ (M=1, 2, ..., M). Thus, for each illuminant color E$_M$ being evaluated, the probability Pr(E$_1$|C) that E$_M$ is the illuminant color given the raw image data C is determined for all scene classes. In one embodiment, the illuminant color that is associated with the maximum value of Pr(E|C) is chosen and input to image adjustor 25 (FIG. 2).

Figure 5:
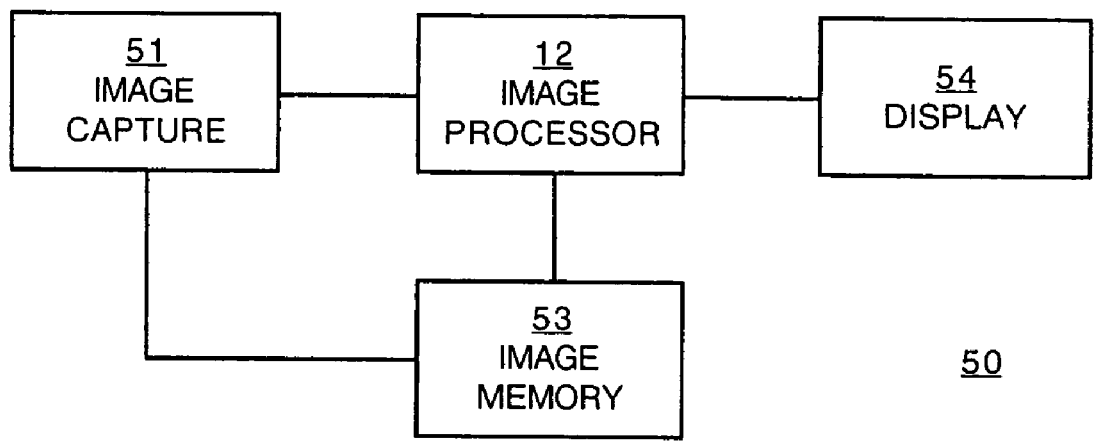
FIG. 5 is a block diagram of an imaging system upon which embodiments in accordance with the present invention may be implemented.

FIG. 5 is a block diagram of an image capture and processing system 50 (e.g., a digital camera or a digital video recorder) upon which embodiments in accordance with the present invention may be implemented. In the example of FIG. 5, system 50 includes an image capture device 51 (e.g., a detector), which may be a charged coupled device (CCD) imager or a complementary metal-oxide semiconductor (CMOS) imager. The image capture device 51 may include lenses and other subcomponents. System 50 also includes an image processor 12 that includes the hardware, software and/or firmware necessary for implementing the image data processing methodology described herein. In the present embodiment, system 50 also includes image memory 53 that stores image data before, during and after processing of that data by image processor 12. In one embodiment, system 50 also includes a display 54 for displaying the image captured and represented by the image data, and for displaying menus and commands as part of a user interface.

Figure 6:
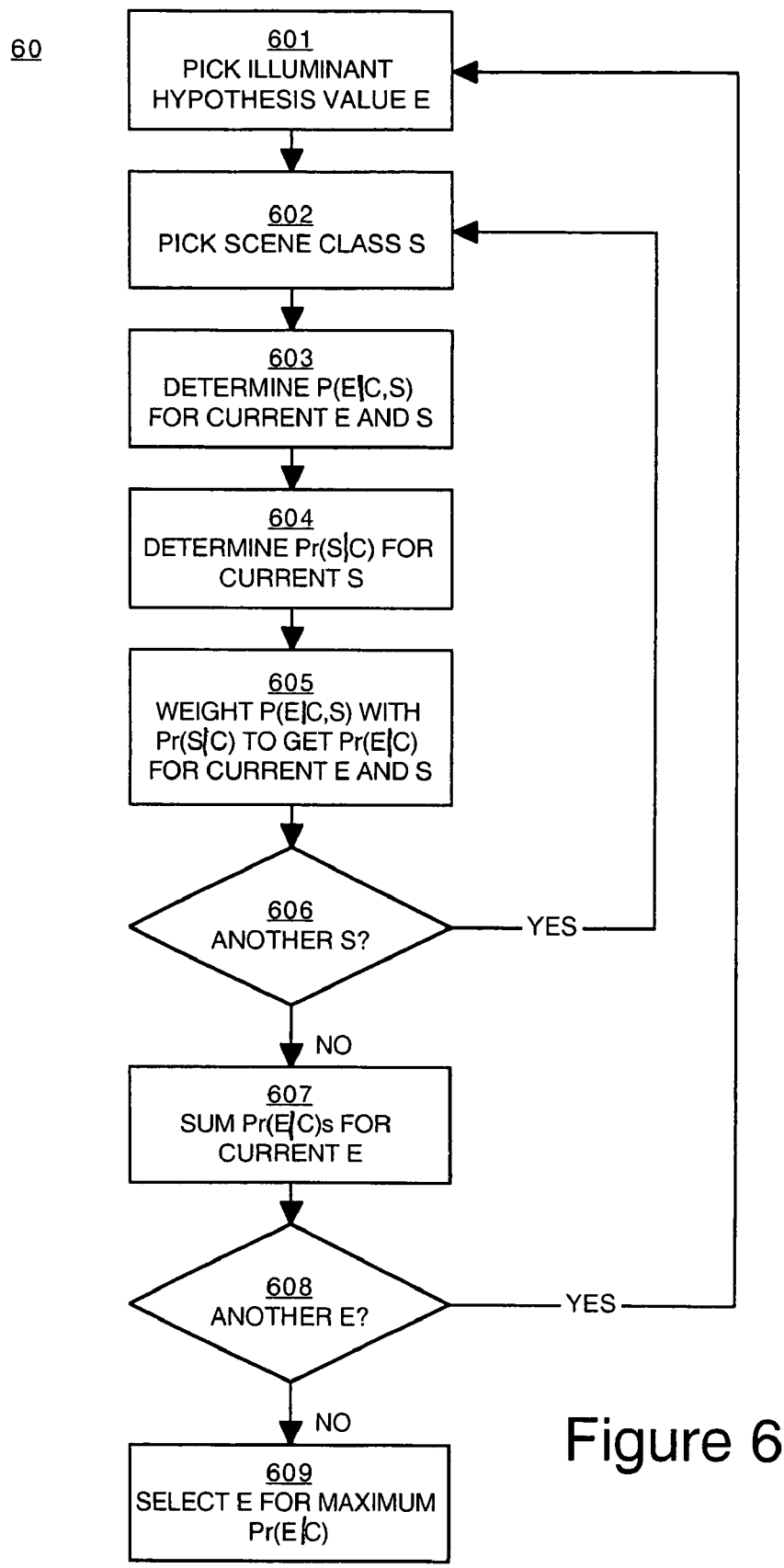
FIG. 6 is a flowchart of a method for processing image data according to one embodiment of the present invention.

FIG. 6 is a flowchart 60 of a method for processing image data according to one embodiment of the present invention. Although specific steps are disclosed in flowchart 60, such steps are exemplary. That is, the present invention is well suited to performing various other steps or variations of the steps recited in flowchart 60. It is appreciated that the steps in flowchart 60 may be performed in an order different than presented and that the steps in flowchart 60 are not necessarily performed in the sequence illustrated. In one embodiment, flowchart 60 is implemented as program instructions stored in a computer-readable memory unit of an imaging system 50 and executed by image processor 12 (FIG. 5). In FIG. 6, C is equivalent to C$_{im}$.

In block 601 of FIG. 6, an illuminant hypothesis value E is selected.

In block 602, a scene class S is selected.

In block 603, for the current values of E and S, the probability P(E|C,S) that E is the illuminant color given S and the raw image data C is determined. In one embodiment, the probability P(E|C,S) is determined by gamut mapper 23 of FIGS. 2-4. In one embodiment, the probability P(E|C,S) is determined using information fetched or read from scene-class specific LUTs.

In block 604 of FIG. 6, for the current value of S, the probability Pr(S|C) that S is the scene class given the raw image data C is determined. In one embodiment, the probability Pr(S|C) is determined by scene classifier 22 of FIGS. 2-4.

In block 605 of FIG. 6, the probability P(E|C,S) is weighted by the probability Pr(S|C) to determine Pr(E|C) for the current values of E and S.

At block 606, if there is another scene class to consider, then flowchart 60 returns to block 602. Otherwise, flowchart 60 proceeds to block 607.

At block 607, the values of Pr(E|C) for the current value of E and all values of S are summed.

At block 608, if there is another illuminant color to consider, then flowchart 60 returns to block 601. Otherwise, flowchart 60 proceeds to block 609.

At block 609, the maximum of the summed probabilities for all values of E (the summed probabilities determined in block 607 for each value of E) is identified. The value of E associated with the maximum value is selected. The selected value of E is thus identified as the most likely color of the illuminant that was used to illuminate a scene at the time the image data representing an image of the scene was captured. Accordingly, the selected value of E can be applied to white balance the image data.

In summary, embodiments of the present invention provide a hybrid approach of gamut mapping and scene classification. More specifically, according to the present invention, the results of a scene classification step are used to weight the results of a gamut mapping step.

Furthermore, the correlation matrix used by the gamut mapper of the present invention is scene class-dependent. Consequently, the process of preparing the training image database can be better focused. Also, because construction of the correlation matrix focuses on the most probable colors that can occur within the scene classes considered, the effective camera gamut is contracted and thus the memory requirement for the correlation matrix can be reduced. Embodiments in accordance with the present invention thus provide methods and systems that can be used for white balancing, but that consume less memory and utilize an improved training image database relative to conventional techniques.

Embodiments of the present invention are thus described. While the present invention has been described in particular embodiments, it should be appreciated that the present invention should not be construed as limited by such embodiments, but rather construed according to the below claims.

What is claimed is:

1. A method of processing image data, said method comprising:
    using a processor to perform the following steps:
    accessing a frame of image data for an illuminant color selected from a plurality of illuminant colors and for each scene class in a plurality of scene classes, accessing first values that correspond to probabilities that combinations of said illuminant color and said scene classes are associated with said frame of image data, each of said first values corresponding to a combination of said illuminant color and a scene class;
    weighting said first values with respective second values to produce weighted values, wherein said weighted values correspond to said illuminant color, and wherein said second values correspond to probabilities that said scene classes are associated with said frame of image data, each of said second values corresponding to one of said scene classes;
    summing said weighted values to produce a score for said illuminant color;
    repeating said accessing, said weighting, and said summing for each of the remaining said illuminant colors to produce a score for each of said illuminant colors; and
    selecting a particular illuminant color of said illuminant colors based on the scores for said illuminant colors.

2. The method of claim 1 wherein said selecting comprises using the maximum of said scores to select said particular illuminant color.

3. The method of claim 1 further comprising adjusting said image data to compensate for said particular illuminant color.

4. The method of claim 1 wherein said first values are accessed from scene class-dependent lookup tables.

5. The method of claim 1 wherein said processing is performed per pixel of said image data.

6. The method of claim 1 wherein said image data is segmented into segments according to color, wherein a segment comprises pixels of substantially the same color and wherein said processing is performed per segment.

7. The method of claim 6 wherein said pixels are selected regardless of spatial dependence.

8. The method of claim 1 wherein each of said first values comprises a product of i) a probability that said image data is produced for said combination of said illuminant color and said scene class and ii) a probability that said illuminant color is associated with said scene class.

9. The method of claim 8 wherein said product is divided by a probability that said image data is associated with said scene class.

10. A non-transitory computer-readable medium having computer-executable program code embodied therein for causing a computer system to perform a method of processing image data, said method comprising:
    for a plurality of illuminant colors and for a plurality of scene classes, identifying a plurality of respective first values, wherein a first value corresponds to a probability that a combination of an illuminant color and a scene class is associated with a frame of image data;
    for said plurality of scene classes, identifying a plurality of respective second values, wherein a second value corresponds to a probability that a scene class is associated with said frame of image data;
    for said plurality of illuminant colors, weighting said plurality of first values using said plurality of second values to determine a plurality of third values, wherein a third value corresponds to a probability that an illuminant color is associated with said frame of image data; and
    selecting a particular illuminant color based on said plurality of third values.

11. The computer-readable medium of claim 10 wherein said method further comprises adjusting said image data to compensate for said particular illuminant color.

12. The computer-readable medium of claim 10 wherein said method further comprises using the maximum value of said plurality of third values to select said particular illuminant color.

13. The computer-readable medium of claim 10 wherein said identifying a plurality of respective first values further comprises, for said plurality of scene classes, accessing a respective scene class-dependent lookup table to identify a plurality of respective fourth values, wherein a fourth value corresponds to a probability of obtaining said image data given an illuminant color.

14. The computer-readable medium of claim 10 wherein said processing is performed per pixel.

15. The computer-readable medium of claim 10 wherein said image data is segmented into segments according to color, wherein a segment comprises pixels of substantially the same color and wherein said processing is performed per segment.

16. An imaging system comprising:
    a memory for storing image data; and
    a processor coupled to said memory and for processing said image data, said processor operable for determining first values that correspond to probabilities that respective combinations of act illuminant colors and scene classes are associated with a frame of said image data, for determining second values that correspond to probabilities that respective said scene classes are associated with said frame of image data, for weighting said first values with respective said second values, and for adjusting said image data to compensate for a selected illuminant color that is selected from said illuminant colors based on said weighting.

17. The imaging system of claim 16 wherein said first values and said second values are determined for each of said scene classes to generate a plurality of illuminant color-dependent weighted values, wherein said weighted values are summed for each of a plurality of illuminant colors to determine a plurality of summed values, wherein said plurality of summed values is used to choose said selected illuminant color.

18. The imaging system of claim 17 wherein the maximum of said summed values is used to choose said selected illuminant color.

19. The imaging system of claim 16 wherein said first values are determined using scene class-dependent lookup tables comprising probabilities that said image data would be obtained given an illuminant color.

20. The imaging system of claim 16 wherein said processing is performed per pixel.

21. The imaging system of claim 16 wherein said processor is also operable for segmenting said image data into segments according to color, wherein a segment comprises pixels of substantially the same color and wherein said processing is performed per segment.

* * * * *